US012722603B2

(12) United States Patent
McAlpine

(10) Patent No.: US 12,722,603 B2
(45) Date of Patent: Sep. 1, 2026

(54) AXLE REPAIR KIT

(71) Applicant: Gregory James McAlpine, Chicago, IL (US)

(72) Inventor: Gregory James McAlpine, Chicago, IL (US)

(73) Assignee: Milton Industries, InC., Chicago, IL (US)

( * ) Notice: Subject to any disclaimer, the term of this patent is extended or adjusted under 35 U.S.C. 154(b) by 0 days.

(21) Appl. No.: 19/187,114

(22) Filed: Apr. 23, 2025

(65) Prior Publication Data

US 2025/0333030 A1 Oct. 30, 2025

Related U.S. Application Data

(60) Provisional application No. 63/638,068, filed on Apr. 24, 2024.

(51) Int. Cl.

*B60S 5/00* (2006.01)
*B23P 6/00* (2006.01)
*B60B 3/16* (2006.01)

(52) U.S. Cl.

CPC . *B60S 5/00* (2013.01); *B23P 6/00* (2013.01); *B60B 3/16* (2013.01)

(58) Field of Classification Search

CPC ................. B60S 5/00; B23P 6/00; B60B 3/16
See application file for complete search history.

(56) References Cited

U.S. PATENT DOCUMENTS 3,106,012 A * 10/1963 Comer .................... B25B 27/02 29/254
3,163,928 A * 1/1965 Shafer .................. B25B 27/023 29/259
4,283,827 A * 8/1981 Abel ...................... B25B 27/02 29/254
4,965,921 A * 10/1990 Priest ..................... B25B 27/02 29/244
5,323,524 A * 6/1994 Stilwell .................. B25B 27/02 29/254
5,544,402 A * 8/1996 O'Neil .................... B25B 27/02 29/261
2006/0143893 A1* 7/2006 Ebert ........................ B23B 3/24 29/402.01
2015/0121675 A1* 5/2015 Campoli ............. B25B 27/0035 29/266
2016/0075178 A1* 3/2016 Roseberry ............. B60B 27/001 301/109
2016/0305397 A1* 10/2016 Ohl, Jr. ................... B23B 29/02

* cited by examiner

*Primary Examiner* — Seahee Hong
(74) *Attorney, Agent, or Firm* — Justin Lampel

(57) ABSTRACT

An axle repair kit is provided. The axle repair kit may be used on different vehicles, but is especially suitable for use in connection with a Ford® F-150. The axle repair kit allows a user to easily drill out a broken axle bolt for replacement with machine-shop precision. The kit includes a circular center disc, a drill bushing and a first arm and a second arm. The first arm and the second arm are generally identical, having a circular opening and an elongated opening.

4 Claims, 7 Drawing Sheets

11

13
C
B
A
14
11
10
76
95
16
15

A
B
C
91

10
12
14
16
15

AXLE REPAIR KIT

REFERENCE TO RELATED APPLICATIONS

This application is based on and claims priority to U.S. Provisional Application No. 63638068 which was filed on Apr. 24, 2024, the entire contents of which are incorporated by reference herein.

BACKGROUND OF THE INVENTION

An axle repair kit is provided. The axle repair kit may be used on different vehicles, but is especially suitable for use in connection with a Ford® F-150. The axle repair kit allows a user to easily drill out a broken axle bolt for replacement with machine-shop precision. The kit includes a circular center disc, a drill bushing and a first arm and a second arm. The first arm and the second arm are generally identical, having a circular opening and an elongated opening.

Tools for fixing an axle are known. For example, U.S. Patent Publication Number 20160023513 to Crockett discloses a spare stub assembly having a circular flange attached to a spindle that has been inserted within a hole centrally located in the central flange. A set of holes are disposed symmetrically about the large flat surface of the flange. The back end of the spindle is placed within a tubular member that has a corresponding second flange attached at an end thereof. This second flange likewise has a central hole and a set of holes disposed symmetrically about the large flat surface of the second flange. The back end of the spindle is inserted within the hole in the second flange associated with the tubular member and onwards therein; this is followed by the bolts and locking nuts application between the two sets of flanged holes thereby locking the two flanges together and permitting easy replacement of a worn spindle. Another spare stub assembly attached similarly to a third flange that is itself attached to the other end of the tubular member opposite the first flange is an option.

Further, U.S. Pat. No. 6,024,418 to Ebert discloses a technique and related assembly for repairing axles such as large heavy duty axles for semitrailers and vehicles are disclosed. A single replacement spindle is utilized in conjunction with one of several sleeve components for the repair. The technique enables a wide array of axles to be easily repaired with a relatively small selection of components.

However, these patent documents fail to describe an axle repair kit which is easy to use. Further, these patent documents fail to provide for an axle repair kit which is especially suitable for repairing a wheel assembly of a Ford® F-150.

SUMMARY OF THE INVENTION

An axle repair kit is provided. The axle repair kit may be used on different vehicles, but is especially suitable for use in connection with a Ford® F-150. The axle repair kit allows a user to easily drill out a broken axle bolt for replacement with machine-shop precision. The kit includes a circular center disc, a drill bushing and a first arm and a second arm. The first arm and the second arm are generally identical, having a circular opening and an elongated opening.

An advantage of the present axle repair kit is that the present kit allows a user to quickly drill out a broken axle bolt.

Another advantage of the present axle repair kit is that the present kit allows for dead-center drilling of the broken bolt.

Y et another advantage of the present axle repair kit is that the present repair kit saves time, energy and frustration typically associated with prior art axle repair tools and methods.

For a more complete understanding of the above listed features and advantages of the axle repair kit reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

Figure 1:
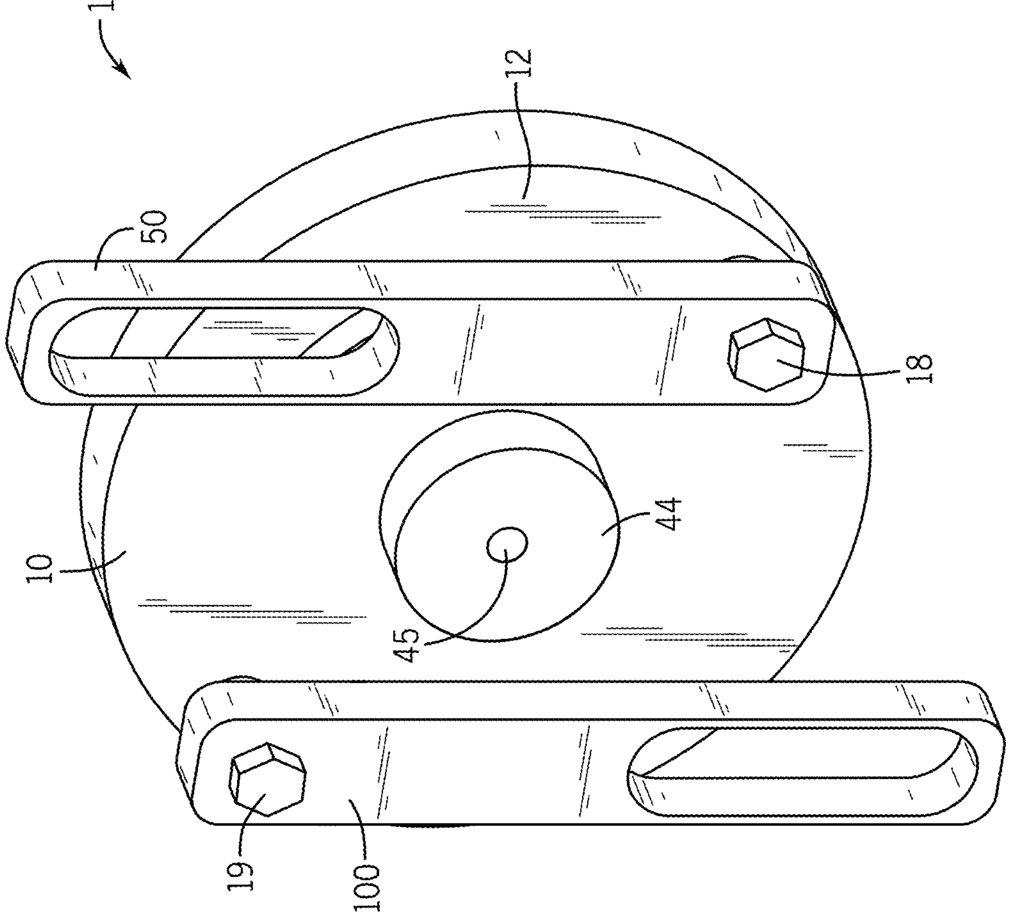
FIG. 1 illustrates a perspective view of the center circular unit and drill bushing with pins securing the first arm and the second arm.
Figure 5:
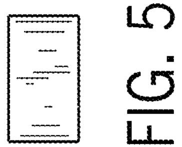
FIG. 5 illustrates a top view of one of the two arms.
Figure 4:
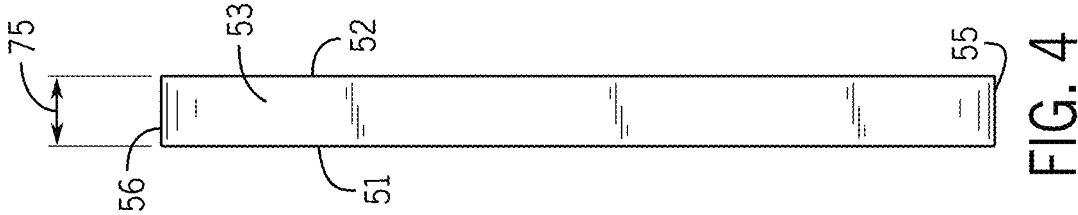
FIG. 4 illustrates a side view of one of the two arms.
Figure 3:
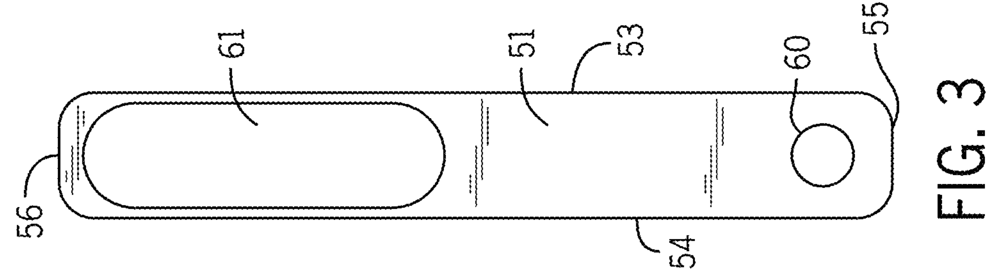
FIG. 3 illustrates a front view of one of the two arms.
Figure 2:
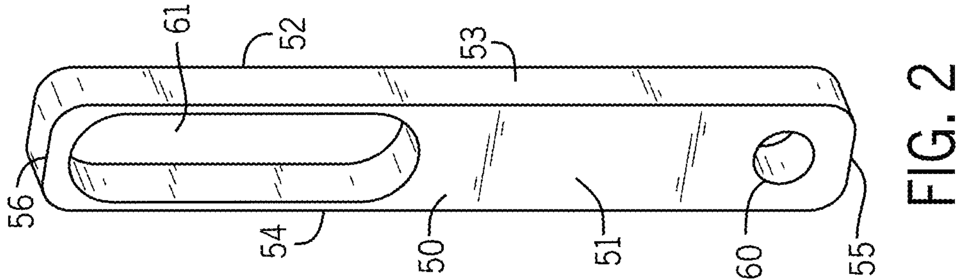
FIG. 2 illustrates a perspective view of one of the two generally identical arms.
Figures 6, 7:
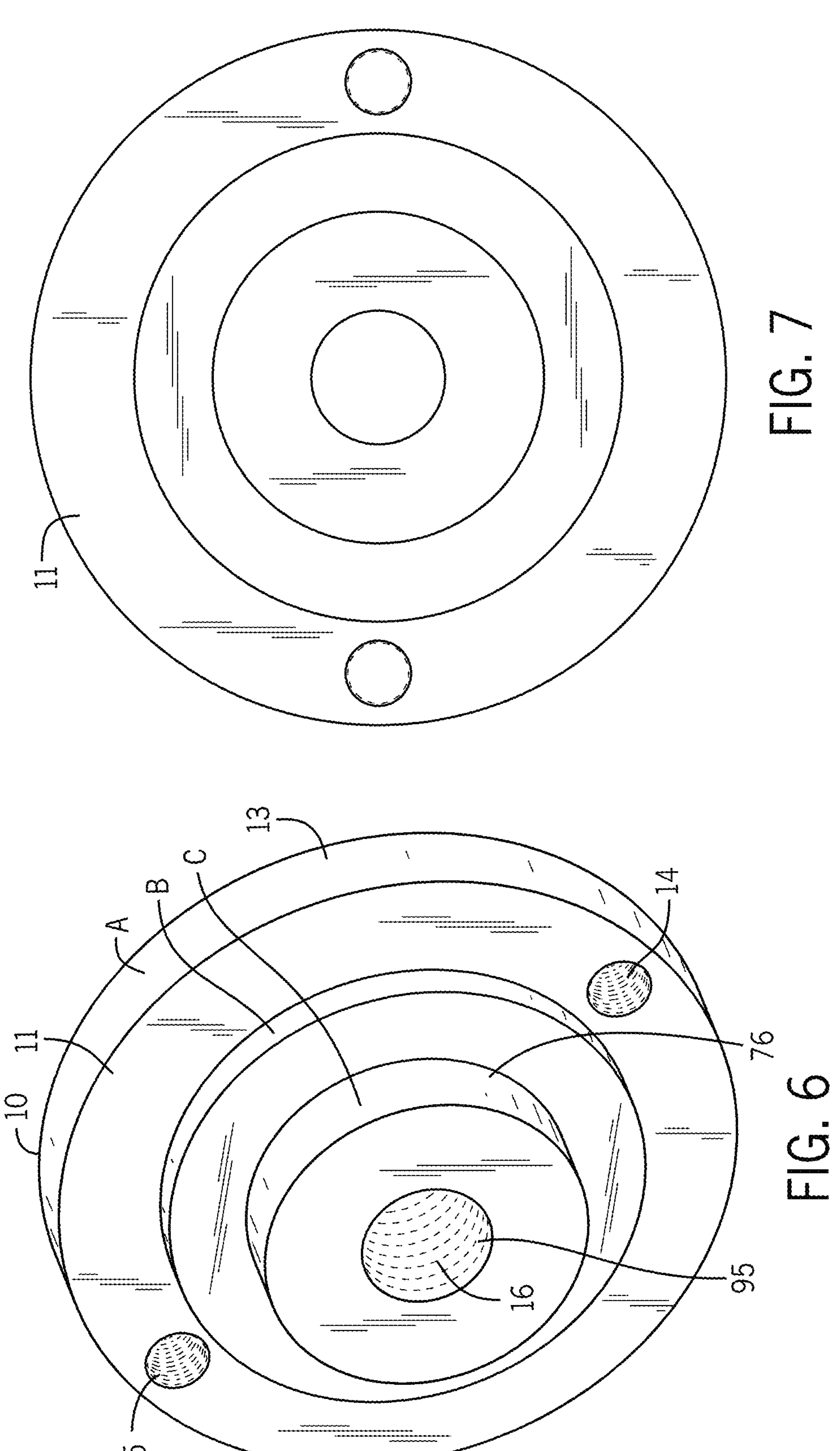
FIG. 6 illustrates a perspective view of the front of the center circular unit.
FIG. 7 illustrates a front view of the center circular unit.

An axle repair kit is provided. The axle repair kit may be used on different vehicles, but is especially suitable for use in connection with a Ford® F-150. The axle repair kit allows a user to easily drill out a broken axle bolt for replacement with machine-shop precision. The kit includes a circular center disc, a drill bushing and a first arm and a second arm. The first arm and the second arm are generally identical, having a circular opening and an elongated opening.

Referring now to the figures, in an embodiment an axle repair kit 1 is provided. The axle repair kit 1 has a center circular unit 10, a first arm 50, a second arm 100 and a drill bushing 44. The first arm 50 and the second arm 100 may be removably attached to the center circular unit 10 during use or may be removed from the center circular unit 10 during storage of the kit 1. The drill bushing 44 may also be removably attached to the center circular unit 10. Preferably, the center circular unit 10, the drill bushing 44 and the first arm 50 and the second arm 100 are made from a durable, non-corrosive metal.

Figures 8, 9:
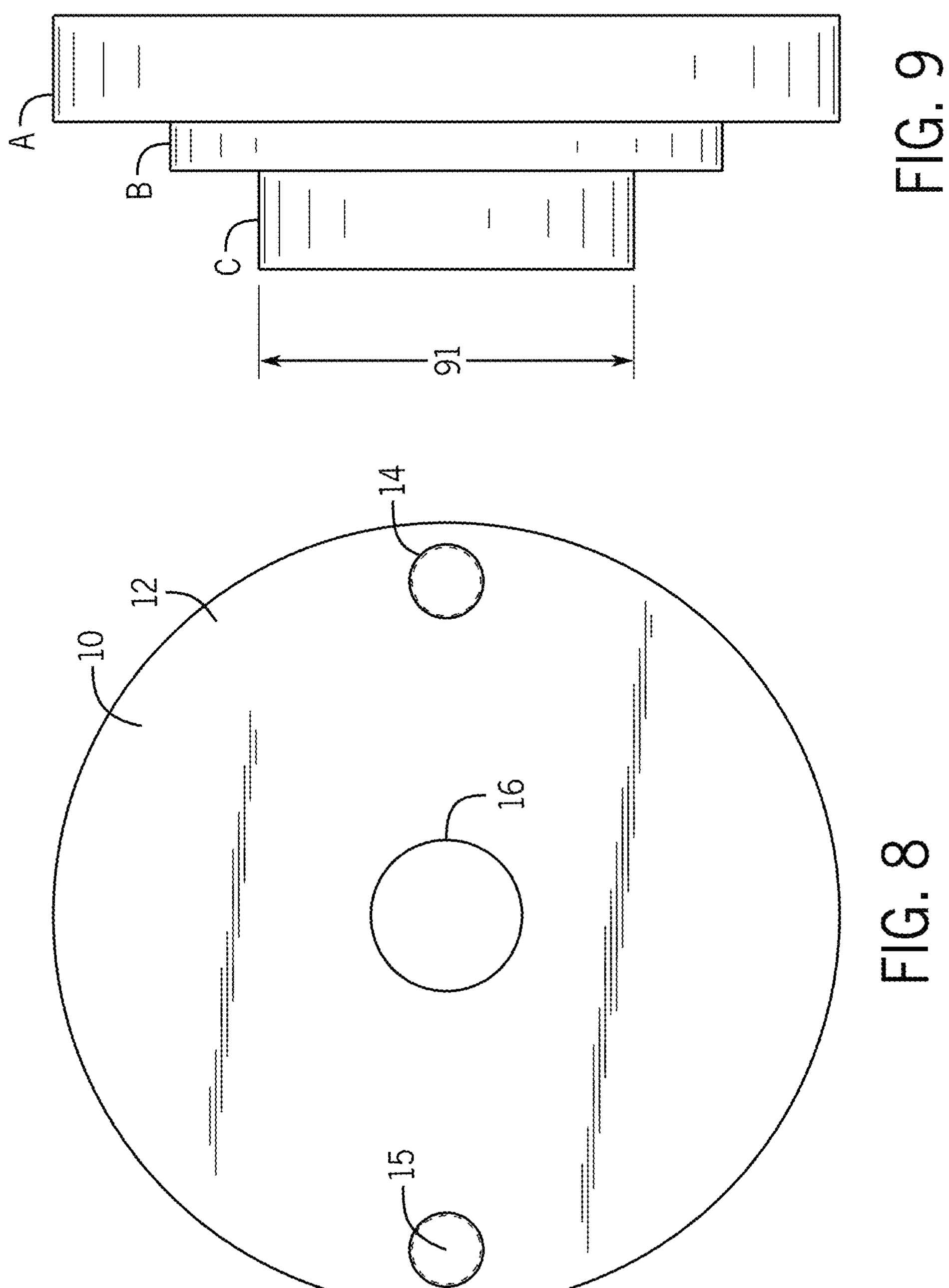
FIG. 8 illustrates a back view of the center circular unit.
FIG. 9 illustrates a side view of the center circular unit.
Figure 10:
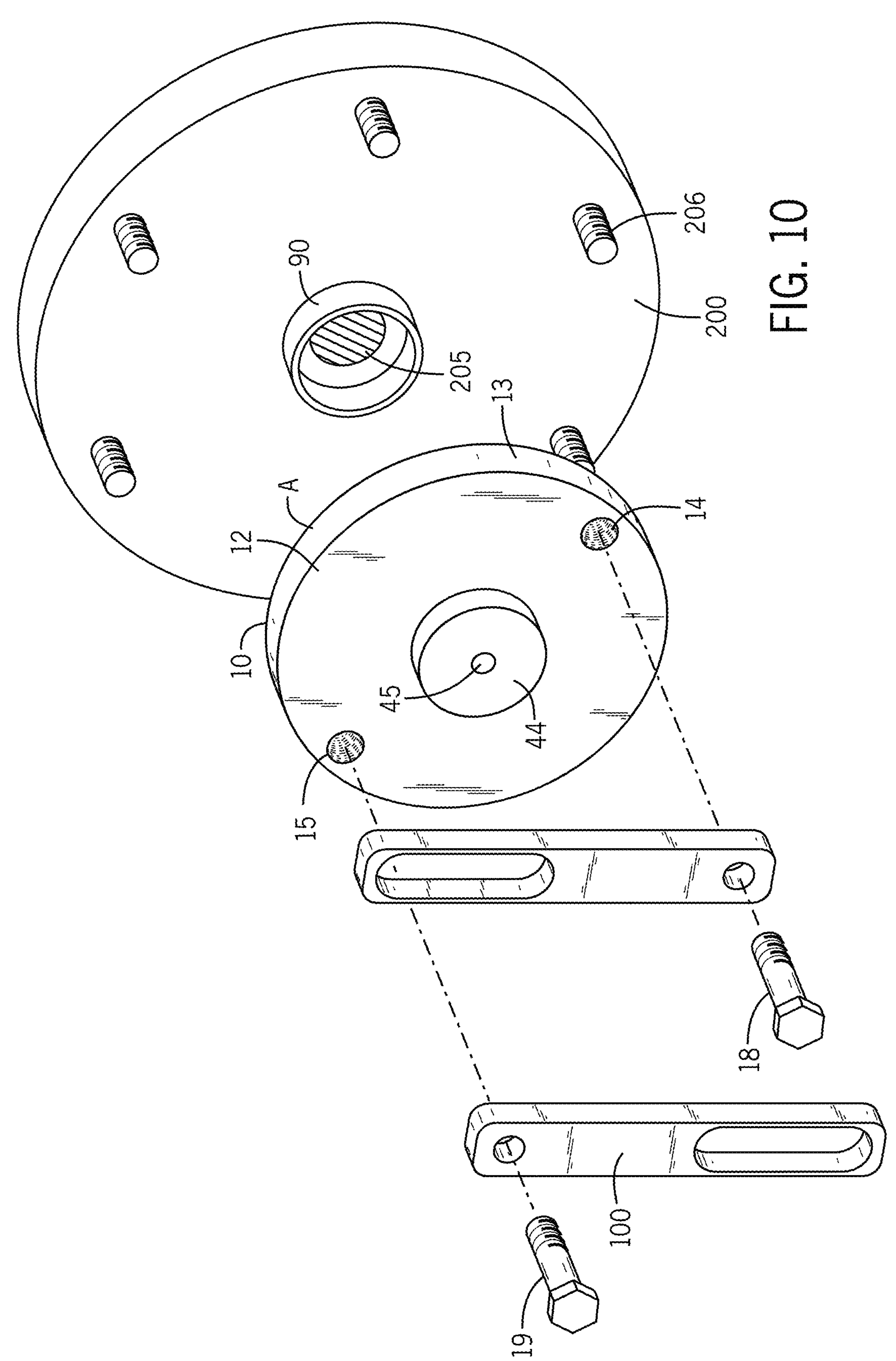
FIG. 10 illustrates an exploded view of the first arm and the second arm being secured to a wheel hub with a broken axle wherein the drill busing is already secured to the center circular unit.
Figure 11:
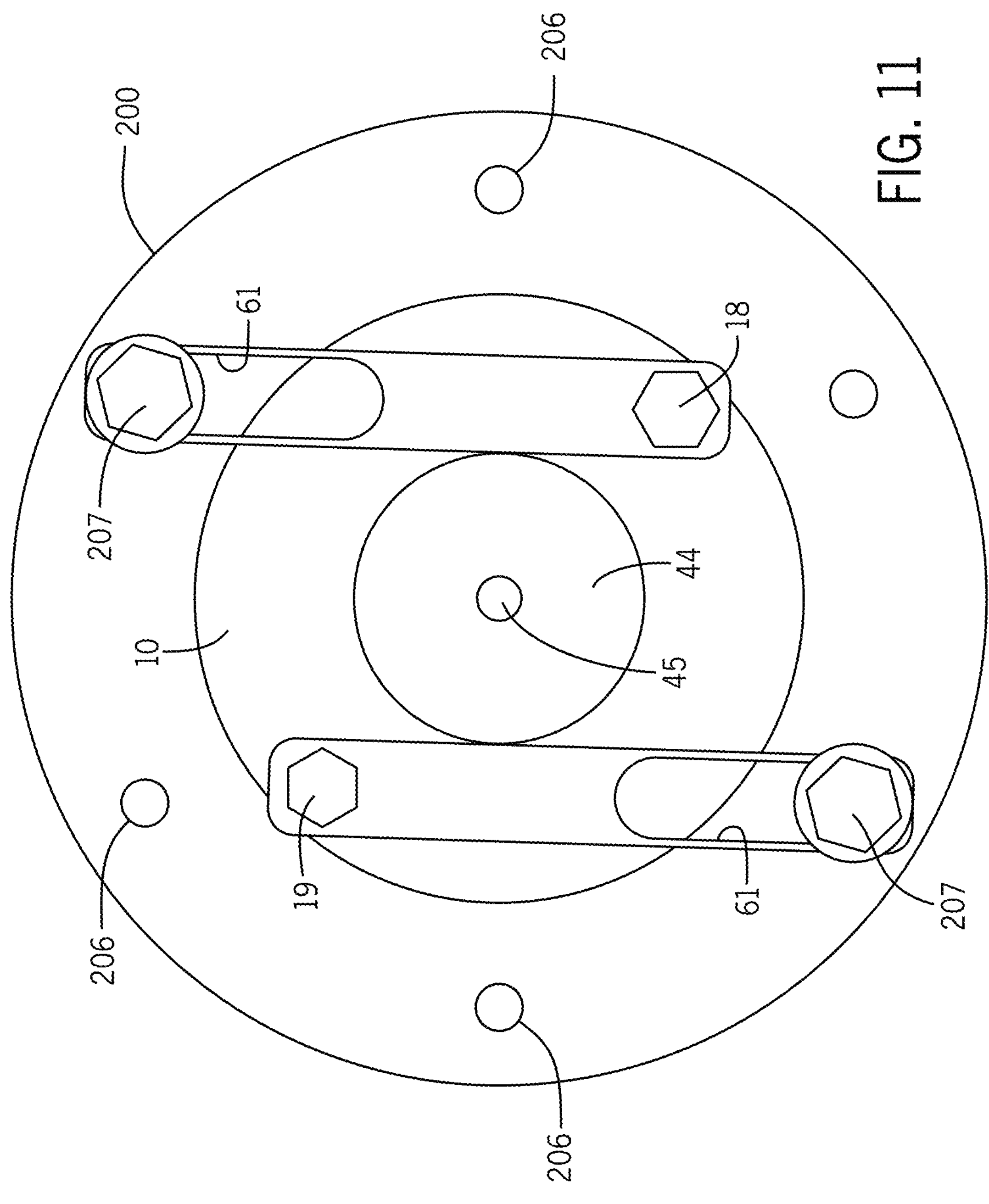
FIG. 11 illustrates the fully functional assembly of the kit attached to the wheel hub.
Figure 12:
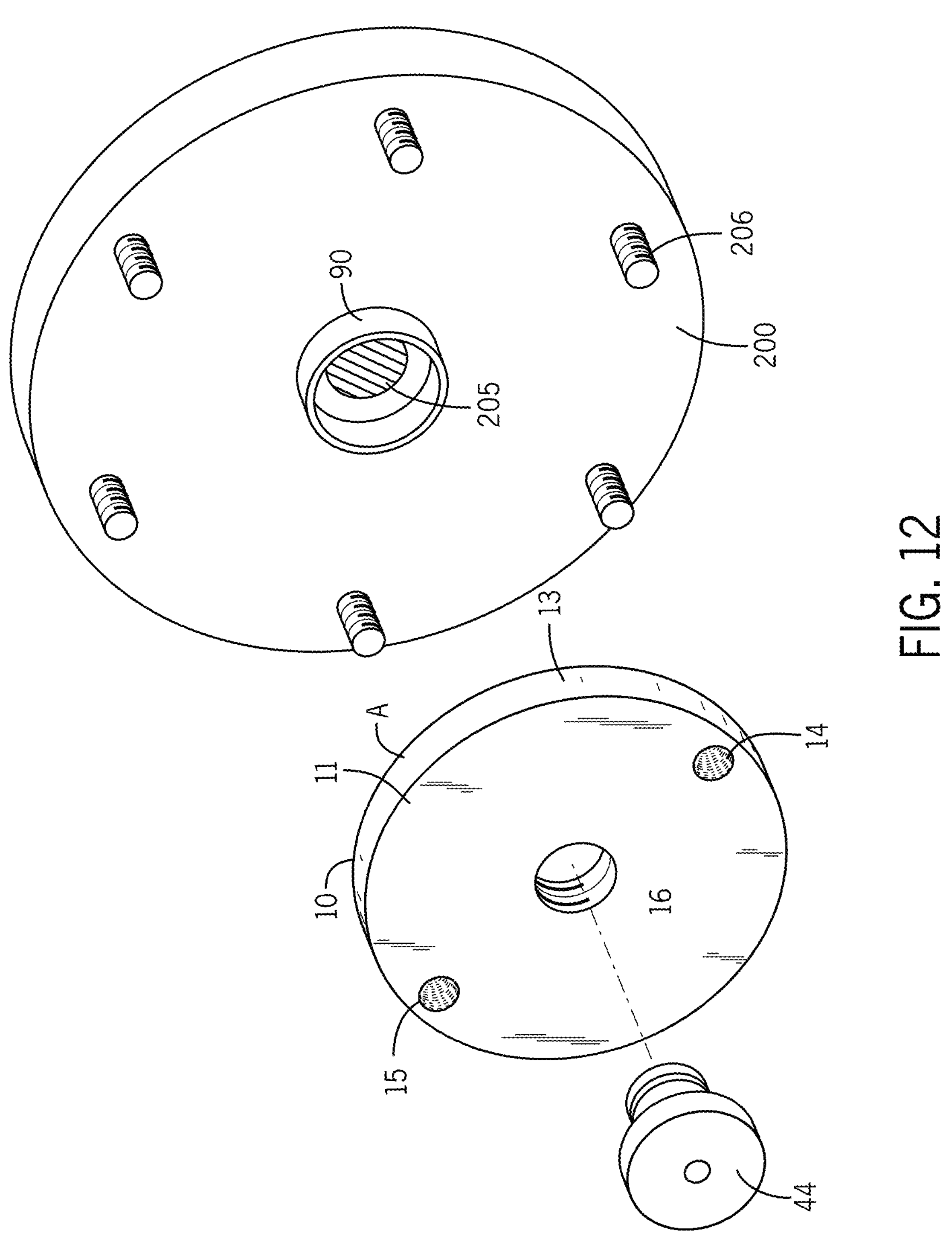
FIG. 12 illustrates an exploded view of the drill bushing being inserted into the center circular unit and the center circular unit being inserted into the wheel hub.

The center circular unit 10 may have a front 11, a back 12 and preferably a circular side 13. In an embodiment, the center circular unit 10 may have a plurality of layers A, B, C having different circumferences as best illustrated in FIG. 9. The multiple layers A, B, C provide precise alignment and rigidity and allow for the center circular unit 10 to be secured to a wheel hub 200 as described below. Layer C may have a side 76. A first opening 14 and a second opening 15 may be located on the back 12 of the center circular unit 10.

Preferably, the first opening 14 and the second opening 15 are located on layer A of the center circular unit 10. A center opening 16 may be located at the center of the center circular unit 10 and may pass through all three layers A, B, C. The first opening 14, and the second opening 15 may create a passageway which extends through the entire center circular unit 10.

The first opening 14 and the second opening 15 may receive a first pin 18 and a second pin 19. The first opening 14 and the second opening 15 may be of equal size and may both be smaller than the opening 16 of the center of the center circular unit 10. The first opening 14 and the second opening 15 may be located at or near the perimeter/circumference of the center circular unit 10 whereas the center opening 16 of the center circular unit 10 is located in the direct center of the center circular unit 10.

The first arm 50 and the second arm 100 may be generally identical to each other. The first arm 50 may have a front 51, a back 52, a first side 53, a second side 54, a bottom 55, a top 56 and a width 75. A first circular opening 60 may be located near the bottom 55 of the first arm 50. A second opening 61 may be generally an elongated opening and may be located near the top 56 of the first arm 50 and the second arm 100.

The first pin 18 may pass through both the first opening 14 of the center circular unit 10 and the first circular opening 60 of the first arm 50 so that the first arm 50 is temporarily secured to the center circular unit 10. The second pin 19 may pass through the second opening 15 of the center circular unit 10 and the first opening 60 of the second arm 100 so that the second arm 100 is temporarily secured to the center circular unit 10.

During use, the bottom 55 of the first arm 50 and the bottom 55 of the second arm 100 are substantially located within the circumference of the center circular unit 10 whereas the top 56 of the first arm 50 and the top 56 of the second arm 100 are located outside the circumference of the center circular unit 10 as best illustrated in FIG. 1.

When the first arm 50 and the second arm 100 are secured to the center circular unit 10 by the first pin 18 and the second pin 19, the tops 56 of the first arm 50 and the top 56 of the second arm 100 may rotate whereas the bottom end 55 of the first arm 50 and the bottom end 55 of the second arm 100 do not move laterally, but instead may only pivot via the pins 18, 19.

As a method of use, to use the axle repair kit 1 a user first inserts the center circular unit 10 over the center of the vehicle axle wheel hub 200 having the broken center bolt 205 by placing the center opening 16 of the center circular unit 10 over the broken center bolt 205 of the wheel hub 200 of the vehicle. Layer C may be inserted substantially into a circular center receiving unit opening 90 of the wheel hub 200 to help secure the center circular unit 10 to the wheel hub 200 and to align the kit 1 for drilling the broken bolt 205. In particular, the diameter 91 and the width 76 of layer C of the center unit 10 may snugly fit within the circular center receiving unit opening 90 of the wheel hub 200 which may have a similar or slightly greater diameter and depth.

A s stated above, the first pin 18 and the second pin 19 are first inserted into the openings 60 of the first arm 50 and the second arm 100 respectively. The first pin 18 and second pin 19 are then inserted through the first opening 14 and the second opening 15 of the center unit 10 so that the first arm 50 and the second arm 100 become temporarily attached to the center circular unit 10. The first arm 50 and the second arm 100 may then rotate around the pin 18, 19 so that the bottoms 55 of the first arm 50 and the second arm 100 are generally stationary while the top ends 56, may swing freely.

The elongated second openings 61 are then secured around bolts 206 of the actual wheel hub 200 assembly. The elongated openings 61 allow the user to adjust the position of the arms 50, 100 with respect to the bolts 206 of the wheel hub 200 so that the bolts 206 of the wheel hub 200 properly align within the elongated openings 61 of the first arm 50 and the second arm 100. Nuts 207 are then applied and tightened to the bolts 206 of the actual wheel assembly to secure the first arm 50 and the second arm 100 in a secure position on the center circular unit 10. Once the center circular unit 10, the first arm 50 and the second arm 100 are secured, a user may insert the circular drill busing 44 into the opening 16 of the center unit 10 (alternatively the drill bushing 44 may be inserted into the center circular unit 10 first). Preferably, the circular drill busing 44 is secured to the center unit 10 opening 16 by screwing/twisting the circular drill busing 44 into the opening 16 of the center unit 10 by use of a threaded member 95. Once the drill bushing 44 is secured to the center unit 10, a power drill (not shown) is used in a center opening 45 of the drill bushing 44 to accurately drill the center bolt 205 of the actual wheel hub 200 assembly to remove and replace the broken bolt 205. The kit 1 may therefore allow a user to accurately drill the center of the broken bolt 205 of the wheel hub 200 assembly. Once the bolt 205 is drilled and the broken bolt 205 removed, the kit 1 may be removed and a new bolt 205 may be inserted.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. An axle repair kit comprising:

a center circular unit having a center opening and having two additional openings located near a perimeter of the center circular unit;

a first arm for securing to the center circular unit;

a second arm for securing to the center circular unit;

wherein the first arm and the second arm are temporarily secured to the center circular unit and wherein a drill is used in the center opening of the center circular unit for repairing a broken bolt of a vehicle axle;

a drill bushing removably secured to the center opening of the center circular unit wherein the drill bushing has a center opening and wherein a drill bit is placed in the center opening of the drill bushing; and a threaded member located on the drill bushing wherein the threaded member of the drill bushing correspondingly mates with and is secured to a threaded member located within the center opening of the center circular unit.

2. An axle repair kit comprising:

a center circular unit having a center opening and having two additional openings located near a perimeter of the center circular unit;

an elongated first arm for securing to the center circular unit wherein the elongated first arm receives a bolt;

an elongated second arm for securing to the center circular unit wherein the elongated second arm receives a bolt;

wherein the elongated first arm and the elongated second arm are temporarily secured to the center circular unit and wherein a drill is used in the center opening of the center circular unit for repairing a broken bolt of a vehicle axle; and a drill bushing removably secured to the center opening of the center circular unit wherein the drill bushing has a center opening and wherein a drill bit is placed in the center opening of the drill bushing.

3. The axle repair kit of claim 2 further comprising:

a threaded member located on the drill bushing wherein the threaded member of the drill bushing correspondingly mates with and is secured to a threaded member located within the center opening of the center circular unit.

4. An axle repair kit comprising:

a center circular unit having a center opening and having two additional openings located near a perimeter of the center circular unit;

an elongated first arm for securing to the center circular unit wherein the elongated first arm receives a bolt;

an elongated second arm for securing to the center circular unit wherein the elongated second arm receives a bolt;

wherein the elongated first arm and the elongated second arm are temporarily secured to the center circular unit and wherein a drill is used in the center opening of the center circular unit for repairing a broken bolt of a vehicle axle; and wherein the center circular unit has multiple tier layers of decreasing diameters.

* * * * *